United States Patent [19]

Itamura et al.

[11] Patent Number: 5,389,709

[45] Date of Patent: Feb. 14, 1995

[54] RESIN COMPOSITION

[75] Inventors: Sumio Itamura; Tohei Moritani; Toshiaki Sato; Taichi Negi, all of Kurashiki, Japan

[73] Assignee: Kuraray Co., Ltd., Kurashiki, Japan

[21] Appl. No.: 973,214

[22] Filed: Nov. 6, 1992

Related U.S. Application Data

[63] Continuation of Ser. No. 856,842, Mar. 23, 1992, abandoned, which is a continuation of Ser. No. 527,070, May 22, 1990, abandoned.

[30] Foreign Application Priority Data

May 30, 1989 [JP] Japan .................................. 1-137752
May 30, 1989 [JP] Japan .................................. 1-137753

[51] Int. Cl.6 ............................................. C08L 29/04
[52] U.S. Cl. ..................................... 524/239; 524/242; 524/427; 524/436; 524/449; 524/451; 524/503; 524/528; 525/60; 525/61; 525/240
[58] Field of Search ............... 524/239, 242, 427, 436, 524/449, 451, 503, 528; 525/60, 61, 240

[56] References Cited

U.S. PATENT DOCUMENTS 3,931,449 1/1976 Hirata et al. .................... 428/474
3,975,463 8/1976 Hirata et al. .................... 428/36.9
4,613,644 9/1986 Moritani et al. ................. 524/430

FOREIGN PATENT DOCUMENTS 53-39380 4/1978 Japan .
55-142650 11/1980 Japan .
55-154232 12/1980 Japan .

Primary Examiner—John C. Bleutge
Assistant Examiner—Mark D. Sweet
Attorney, Agent, or Firm—Kramer, Brufsky & Cifelli

[57] ABSTRACT

Provided are resin compositions comprising the following (A), (B), (C), which is at least one member selected from ($C_1$) through ($C_3$), and (D):

(A): a polyolefin, (B): a saponified product of an ethylene-vinyl acetate copolymer having an ethylene content of 20 to 65 mol % and a saponification degree of vinyl acetate component of at least 96%, (C):

($C_1$): at least one inorganic substance selected from titanium oxide, talc, calcium carbonate, mica and absorptive inorganic materials, ($C_2$): at least one compound selected from the group consisting of metal salts of higher fatty acid having 8 to 22 carbon atoms, metal salts of ethylenediaminetetraacetic acid and hydrotalcite, and ($C_3$): a polyolefin modified with an unsaturated carboxylic acid or derivatives thereof;

and, (D): a saponified product of an ethylene-vinyl acetate copolymer having an ethylene content of 68 to 98 mol % and a saponification degree of vinyl acetate-component of at least 20%.

5 Claims, No Drawings

RESIN COMPOSITION

This application is a continuation of application Ser. No. 07/856,842, filed Mar. 23, 1992, now abandoned, which is a continuation of application Ser. No. 07/527,070, filed May 22, 1990, now abandoned.

BACKGROUND OF THE INVENTION

1. Field of the Invention

The present invention relates to compositions comprising a polyolefin (A), a saponified product of an ethylene-vinyl acetate copolymer (B) and an inorganic material ($C_1$) such as titanium dioxide, being free from troubles at melt formation caused by insufficient compatibility, such as charred resin on screw, generation of gelled matter, pressure increase in extruder and flow instability. The present invention also relates to compositions comprising the above (A) and (B) and at least one member selected from the group consisting of a compound such as hydrotalcite ($C_2$) and a polyolefin modified with an unsaturated carboxylic acid or derivatives thereof ($C_3$), being free from generation of unordinary molding, i.e. generation of turbulence (wavy pattern) on molded articles, caused by insufficient compatibility.

2. Description of the Prior Art

Blend compositions comprising a polyolefin, an EVOH and an inorganic material such as titanium dioxide have distinctive properties. In particular, it is known that the use of the above compositions instead of polyolefin in multilayered co-extrusion of EVOH with various polyolefins provides molded articles with distinctive appearances, such as paper-like and high-grade feeling with what is known as "pearl luster". See for example Japanese Patent Application Laid-open Nos. 142650/1980 and 154232/1980. However, these compositions are generally poor in compatibility within themselves and, hence, when formed into film, sheet, bottle or the like by extrusion molding, tend to generate nonuniform phase-separated irregular matters. The number of the irregular matters increases particularly upon long-period operation to significantly impair the appearance of the molded articles. Where titanium dioxide, in particular, is used as the inorganic material, there occurs many troubles including generation of black deposit ("charred resin on screw") in the extruder, that of galled matters ("lip stain") sticking to the dielip, and the like, thereby markedly deteriorating the appearance and mechanical properties of molded articles. The composition proposed by Japanese Patent Application Laid-open No. 199040/1985 (U.S. Pat. No. 4,613,644) is effective to eliminate the above troubles when the content of EVOH is small but does not completely eliminate them when the amount of EVOH becomes larger. Where talc is used as the inorganic material, flow instability occurs immediately after the start of molding operation, then galled matters accumulate on the dielip and other parts to impair the appearance of molded articles, and further the inside pressure of the extruder increases to render it impossible to continue the operation. Extrusion molding of the composition comprising polyolefin, EVOH and an inorganic material thus has not been practiced, or, has, if ever, been practiced only for a short time period, in spite of the fact that the molded articles showed excellent characteristics.

There has been proposed, for the purpose of improving gas barrier properties of polyolefin, blending polyolefin with EVOH having high gas barrier property. See for example Japanese Patent Application Laid-open No. 38984/1974 (U.S. Pat. No. 3,931,449). However, in this process, the blending ratio of polyolefin must be at least 50 parts by weight based on the total weight to secure an adhesion between polyolefin and said blend, and, then, the blend causes flow instability to occur upon molding due to poor compatibility between the polyolefin and EVOH within the blend, thereby yielding poor appearance of molded articles. Further Japanese Patent Application Laid-open No. 39380/1978 proposes that 25 to 60 parts of an EVOH having a melt index of at least 3 times that of the polyolefin to be blended and 5 to 40 parts of a saponified product of an ethylene-vinyl acetate copolymer having an ethylene content of 70 to 98 mol % and a saponification degree of vinyl acetate component of at least 20% are added to 100 parts of polyolefin and the obtained blend is laminated with polyolefin. However, it does not disclose that flow instability such as lip stain on dielip, which generates when talc, etc. is blended, can be prevented thereby. Furthermore, the compatibility of the saponified product of ethylene-vinyl acetate copolymer with polyolefin is still poor, thereby causing intralayer delamination and lowering the strength of the molded articles. When this blend is used as an outer layer, molded articles have pear-skin pattern and turbulence (wavy pattern) on their surface and cannot be used for practical purposes.

Japanese Patent Application Laid-open No. 199040/1985 (U.S. Pat. No. 4,613,644) discloses a resin composition comprising polyolefin (A), EVOH (B) and a compound such as hydrotalcite ($C_2$) to prevent charred resin on screw in molding operation. This resin composition however has, upon melt molding or co-extrusion molding, for example when the EVOH is used in a large amount, problem of generating wavy pattern on the surface of molded articles.

SUMMARY OF THE INVENTION

An object of the present invention is to provide a composition comprising polyolefin, EVOH and an inorganic material ($C_1$) as specified below, which will be smoothly molded into molded articles having neat appearance without generating charred resin on screw, lip stain or flow instability considered to be caused by poor compatibility among the components, and scraps such as "regrind" of which can be reused effectively.

Another object of the present invention is to provide a composition comprising polyolefin, EVOH and a compound ($C_2$) such as hydrotalcite as specified below and/or a polyolefin ($C_3$) modified with an unsaturated carboxylic acid or derivatives thereof, will not cause any instable molding such as generation of turbulence (wavy pattern) on the surface of molded articles.

The present inventors have found that incorporation of a specific saponified product of an ethylene-vinyl acetate copolymer (D) (hereinafter referred to as S-EVOH) having an ethylene content of 68 to 98 mol % and a saponification degree of vinyl acetate component of at least 20%, into a composition comprising polyolefin (A), EVOH (B), and a specific inorganic material ($C_1$) can make the resulting composition co-extrusion moldable into molded articles having neat appearance, without encountering generation of charred resin on screw or lip stain and flow instability.

The present inventors have further found that a composition comprising polyolefin (A), EVOH (B), a polyolefin modified with an unsaturated carboxylic acid or derivatives thereof, and further S-EVOH (D) can be molded into molded articles having high gas barrier property and neat appearance, and having resistance to interlayer delamination and no intralayer delamination.

The present inventors have still further found that a composition comprising polyolefin (A), EVOH (B), a compound such as hydrotalcite ($C_2$), and further S-EVOH (D) can be molded into molded articles having neat appearance without turbulence (wavy pattern). Hereinafter the group consisting of ($C_1$), ($C_2$) and ($C_3$) is sometimes referred to as (C).

DETAILED DESCRIPTION OF PREFERRED EMBODIMENTS

First of all, the resin composition comprising (A), (B), ($C_1$) and (D) according to the present invention is described.

The polyolefin (A) used in the present invention includes high, medium and low density polyethylenes; polyethylenes copolymerized with an $\alpha$-olefin such as vinyl acetate, acrylic acid esters, butene, hexene and 4-methyl-1-pentene; ionomers; polypropylene homopolymer; polypropylene graft-polymerized with ethylene; polypropylenes copolymerized with an $\alpha$-olefin such as butene, hexene or 4-methyl-1-pentene; modified polypropylenes blended with rubber-related polymers; poly-1-butene; poly-4-methyl-1-pentene and the like. Among the above, polypropylene resins are most important in the present invention, with polyethylene resins coming next.

The EVOH (B) used in the present invention includes any ethylene-vinyl acetate copolymer with its vinyl acetate component hydrolyzed but, those having poor compatibility with polyolefin have relatively low ethylene content and high degree of saponification (hydrolysis) of vinyl acetate component. Particularly, EVOH's having an ethylene content of 20 to 65 mol %, preferably 20 to 60 mol %, more preferably 20 to 50 mol %, and a saponification degree of vinyl acetate content of at least 96%, preferably at least 99% are especially important as the object of the present invention, since they give, when used while being blended with polyolefin, excellent containers.

The EVOH (B) herein may be modified with not more than 5 mol % of a copolymerizable monomer. Examples of the modifying monomer include propylene, 1-butene, 1-hexene, 4-methyl-1-pentene, acrylic acid esters, methacrylic acid esters, maleic acid, fumaric acid, itaconic acid, higher fatty acids, vinyl esters, alkyl vinyl ethers, N-(2-dimethylaminoethyl)methacrylamide or quaternary compounds thereof, N-vinylimidazole or quaternary compounds thereof, N-vinylpyrrolidone, N,N-butoxymethylacrylamide, vinyltrimethoxysilane, vinylmethyldimethoxysilane, vinyldimethylmethoxysilane and the like.

The melt index (measured under conditions of 190° C. and 2160 g) of EVOH (B) is preferably at least 0.1 g/10 min, more preferably at least 0.5 g/10 rain, and preferably 100 g/10 min at most, more preferably 50 g/10 min at most, most preferably 30 g/10 min at most.

In the present invention, the inorganic material ($C_1$), among (C), is used for providing a high-grade appearance to molded articles, such as paper-like and pearl luster, and selected from the group consisting of titanium oxide, talc, calcium carbonate, mica and water-absorptive inorganic materials. These inorganic materials may be used singly or in combination. Among these materials, titanium oxide and talc are preferably used. The inorganic material is preferably used in the form of powder finely pulverized, more preferably in the form of microfine powder, since, then, the material can mix well with the resins and, further, help produce higher effect of the present invention. The size of the powder, particularly microfine powder, is not specifically limited, but it is preferably as small as possible. However, the form of ultrafine powder that will malaffect working environment should be avoided in practice.

The water-absorptive inorganic material particularly suited for the purpose of the present invention includes hydrate-forming salts, that is, salts capable of absorbing water as crystallization water, more specifically phosphates such as sodium dihydrogenphosphate, sodium monohydrogenphosphate, sodium phosphate, lithium phosphate, sodium pyrophosphate, and, particularly, anhydrides of the foregoing. The water-absorptive inorganic material also includes other hydrate-forming salts, e.g. sodium borate and sodium sulfate, and particularly anhydrides thereof. Also, other water-absorptive compounds can be used, for example sodium chloride, sodium sulfate, sucrose, silica gel, bentonite, molecular sieve, etc. These water-absorptive materials may be used singly or in combination. Where the water-absorptive inorganic material is used as $C_1$, it can, while providing a high-grade appearance to molded articles, minimize deterioration of the gas barrier property of EVOH by action of water, because it absorbs moisture invading into from outside.

The S-EVOH (D) is, in the present invention, a specific EVOH suitably selected and newly developed for the purpose of significantly improving compatibility of polyolefin (A), EVOH (B) and inorganic material ($C_1$), and is a saponified product of an ethylene-vinyl acetate copolymer having an ethylene content of 68 to 98 mol % and a saponification degree of vinyl acetate component of at least 20%. Those particularly effective in improving compatibility have an ethylene content of at least 70 mol %, and 96 mol % at most, more preferably 94 mol % at most, and a saponification degree of vinyl acetate component of at least 30%, more preferably at least 40%. The upper limit of the saponification degree is not specifically restricted and a saponification degree of substantially 100% can also be used.

With the ethylene content of less than 68 mol % or not less than 98 mol %, or with the saponification degree of vinyl acetate component of less than 20%, flow instability occurs upon molding, whereby molded articles have bad appearance.

The ethylene content of S-EVOH (D) is preferably at least 5 mol % higher than that of EVOH (B), more preferably 10 mol % higher.

The melt index of S-EVOH (D) is preferably at least 0.1 g/10 min, more preferably at least 0.5 g/10 min, and preferably 100 g/10 min at most, more preferably 50 g/10 min at most, most preferably 30 g/min at most.

The S-EVOH used in the present invention may be modified with an unsaturated carboxylic acid or derivatives thereof. The modifying acid monomer is $\alpha, \beta$-unsaturated carboxylic acid, or esters or anhydrides thereof, and examples of the foregoing includes acrylic acid, methacrylic acid, maleic acid, fumaric acid, itaconic acid, monomethyl or ethylesters of maleic acid and fumaric acid, maleic anhydride, itaconic anhydride and the like. These acid monomers may be used singly or in combination.

The blending ratio by weight between polyolefin (A) and EVOH (B) is 60:40 to 99.9:0.1, preferably 65:35 to 99.7:0.3 for the purpose of producing higher effect of the present invention.

In the present invention, the inorganic material ($C_1$) is added in an amount of 0.1 to 150 parts based on 100 parts by weight (hereinafter simply referred to as "parts") of sum of polyolefin (A) and EVOH (B), preferably 0.1 to 100 parts on the same basis. If the addition exceeds 150 parts the extrusion moldability will significantly worsen. On the other hand, an addition less than 0.1 part will not produce sufficient effect of providing molded articles with distinctive appearance.

The amount of S-EVOH (D) added in the present invention depends on the type and composition of the EVOH and inorganic material used and cannot definitely be specified, but it is generally at least 0.3 part based on 100 parts of sum of polyolefin (A) and EVOH (B), and, in practice, 0.3 to 30 parts, preferably 0.3 to 20 parts, more preferably 0.3 to 10 parts on the same basis. If the addition is less than 0.3 part, the effect of improving compatibility will not be produced. While the upper limit is not necessarily specified, the addition of not more than 20 parts is sufficient for practical purposes.

When a composition comprising polyolefin (A), EVOH (B) and inorganic material ($C_1$) is melt molded, the effect of the present invention will be still more marked if this composition is incorporated with pellets obtained by previously incorporating S-EVOH (D) and, as required, inorganic material ($C_1$) into polyolefin (A) or EVOH (B), or into both, and blending and pelletizing the mixture.

In previously incorporating S-EVOH (D) into, for example, EVOH (B), 5 to 100 parts of EVOH (D) is added to 100 parts of EVOH (B). In this case of previously blending S-EVOH (D) with EVOH (B), even a small amount of the S-EVOH (D) will produce a large effect.

The composition of the present invention can be obtained by any blending process, which includes dry blending the four, a process comprising incorporating beforehand S-EVOH (D) into entire or part of polyolefin (A) or EVOH (B), a process comprising first blending inorganic material ($C_1$) with polyolefin (A) or EVOH (B) or both, and then dry blending the blend with the rest of members, a process comprising dry blending granules of the four members, a process comprising blend pelletizing the above composition, a process comprising adding S-EVOH (D) and, as required, polyolefin (A), EVOH (B) and inorganic material ($C_1$) to granules (recovery) obtained by granulating multilayered sheets, cups, bottles or the like containing at least one member selected from the group consisting of a polyolefin (A) layer, a layer of polyolefin (A) and inorganic material ($C_1$), an EVOH (B) layer and a layer of EVOH (B) and inorganic material ($C_1$), and dry blending or blend pelletizing the mixture, and like processes. It is also effective to use a master batch obtained by blend pelletizing inorganic material ($C_1$) with polypropylene, polyethylene or the like.

In the present invention, while the mechanism of significant improvement by action of S-EVOH (D) in compatibility in the melt molded articles comprising polyolefin (A), EVOH (B) and inorganic material ($C_1$) is not quite clear, it is considered that S-EVOH (D) component acts efficiently on the melted system comprising the polyolefin, EVOH and inorganic material, in which rheological effects, dispersing action and the like are complexly combined.

Described next is the composition comprising (A), (B), ($C_1$), ($C_2$) and (D), which is another embodiment of the present invention.

In the present invention, the addition of, in combination with S-EVOH (D), at least one member of compound ($C_2$) selected from metal salts of higher fatty acids having 8 to 22 carbon atoms, metal salts of ethylenediaminetetraacetic acid and hydrotalcite compounds, to a composition comprising (A), (B) and ($C_1$), further improves the compatibility among (A), (B) and ($C_1$). In particular, the improving effect is still more marked where polyolefin, especially polypropylene, containing titanium compound, which is remaining catalyst, is used as polyolefin (A).

The salts of higher fatty acid having 8 to 22 carbon atoms herein are salts of metals, particularly those belonging to Group I, II and III of the periodic table, of the higher fatty acids, and their preferred examples are calcium, magnesium and zinc salts of lauric acid, stearic acid, myristic acid and the like.

The metal salts of ethylenediaminetetraacetic acid are the salts of metals belonging to group I, II and III, and their examples are disodium salt, trisodium salt, tetrasodium salt, dipotassium salt, tripotassium salt, tetrapotassium salt, disodium-magnesium salt, disodium-calcium salt, disodium-iron salt, disodium-zinc salt, disodium-manganese salt, disodium-lead salt, dipotassium-magnesium salt and the like.

Examples of hydrotalcite compounds are, in particular, the complex salts represented by the formula

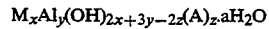

wherein M represents Mg, Ca or Zn, A represents $CO_3$ or $HPO_4$, and x, y, z and a are each 0 or a positive, among which preferred examples are as follows.

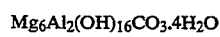

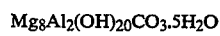

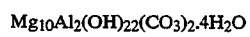

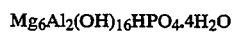

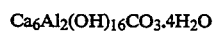

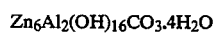

The compound ($C_2$) is added in an amount suitably selected, to produce effect of improving compatibility of (A), (B) and ($C_1$), depending on their types and within the limit not to impair the characteristics of the composition, such as mechanical properties, transparency and gas barrier property. In most cases, the addition is 0.00001 to 10 parts based on 100 parts of total weight, (A+B), of polyolefin (A) and EVOH (B), particularly 0.0001 to 1 part on the same basis. If the addition exceeds 10 parts, properties other than compatibility will tend to be damaged. The compound ($C_2$) is blended with (A), (B), ($C_1$) and (D) in the same manners as described hereinbefore. Particularly effective is a process which comprises incorporating beforehand component ($C_2$) together with S-EVOH into polyolefin and/or EVOH, blend pelletizing the mixture, and incorporating the obtained pellets into (A), (B) and (C), followed by melt molding of the resulting mixture.

Next, the resin composition comprising (A), (B), ($C_2$) and (D), which is still another embodiment of the present invention, is described.

The present inventors have found that the above-described (D) and ($C_2$) have marked effect as agents for improving compatibility between polyolefin (A) and EVOH (B).

Blended compositions of polyolefin (A) and EVOH (B) are known. See for example Japanese Patent Application Laid-open No. 20073/1981 (U.S. Pat. No. 4,284,671). These compositions are poor in compatibility within themselves, and hence, when extrusion molded into film, sheet, bottle or the like, tend to generate nonuniform phase-separated irregular matters. These irregular matters increase in number upon long-period operation and markedly deteriorate the appearance of molded articles. Japanese Patent Application Laid-open No. 199040/1985 (U.S. Pat. No. 4,613,644) discloses incorporation of hydrotalcite or the like into the composition to improve the compatibility. This method, however, produces high effect only when EVOH is used in a small amount and is unsatisfactory when the amount of EVOH becomes larger.

In the present invention, the above-described (D) and ($C_2$) are incorporated into blend composition of polyolefin (A) and EVOH (B), thereby markedly improving the compatibility of the blend composition and realizing long-period continuous operation even when EVOH is present in a large, not to say small, amount, or with a system containing talc, to mold films, sheets, bottles or the like having neat appearance without turbulence (wavy pattern).

(D) and ($C_2$) are added in amounts and by any one of processes as described before. Particularly effective blending process comprises first incorporating (D) and ($C_2$) components in polyolefin and/or EVOH, blend pelletizing the mixture and adding the pellets obtained to polyolefin (A) and EVOH (B), followed by melt molding.

Next, the composition comprising (A), (B), ($C_3$) and D, which is yet another embodiment of the present invention, is described.

The polyolefin resin ($C_3$) modified with an unsaturated carboxylic acid or derivatives thereof used in the present invention includes polyolefins modified with at least one member selected from the group consisting of unsaturated carboxylic acids such as acrylic acid, methacrylic acid, maleic acid, fumaric acid, crotonic acid, itaconic acid and citraconic acid, and esters and anhydrides of the foregoing, and derivatives of unsaturated carboxylic acids, such as methyl acrylate, methyl methacylate, ethyl acrylate, propyl acrylate, butyl acrylate, butyl methacrylate, vinyl acetate, glycidyl acrylate, glycidyl methacrylate, acrylamide, methacrylamide, sodium acrylate and sodium methacrylate. The ($C_3$) also includes compositions comprising the above modified-polyolefins. Examples of the polyolefin to be modified are polyethylene, polypropylene, ethylene-vinyl acetate copolymer and ethylene-acrylate copolymers.

The incorporation ratio of the modified polyolefin resin ($C_3$) is, based on 100 parts of the total amount of (A) and (B), preferably 0.5 to 60 parts, more preferably 1 to 50 parts. The incorporation of S-EVOH (D) based on 100 parts of the total amount of (A) and (B) and the ratio of (A) to (B) are as aforementioned respectively.

There are no particular restrictions with respect to processes for blending the above components to obtain the desired composition. Thus, there are available a process which comprises dry blending the four components, a process which comprises incorporating S-EVOH (D) in entire or part of polyolefin (A) or EVOH (B) beforehand, a process which comprises dry blending granules of the components, a process which comprises blend pelletizing the components, and the like.

Not quite clear is the mechanism of the use of S-EVOH (D) in combination with modified polyolefin resin ($C_3$) so markedly improving compatibility of polyolefin (A) and EVOH (B) in melt molded articles to thereby prevent intralayer delamination. It, however, is considered to be due to synergetic effect of S-EVOH (D) in combination with modified polyolefin resin ($C_3$), which acts efficiently on the melted system containing polyolefin and EVOH, where rheological effects, dispersing action and the like are complexly combined.

As stated heretofore, the resin compositions of the present invention include embodiments of resin compositions comprising (A), (B), (C) that is at least one member selected from ($C_1$) through ($C_3$), and (D), more concretely, those comprising (A), (B), ($C_1$) and (D), those comprising (A), (B), ($C_2$) and (D), those comprising (A), (B), ($C_3$) and (D), those comprising (A), (B), ($C_1$), ($C_2$) and (D), those comprising (A), (B), ($C_1$), ($C_3$) and (D) and those comprising (A), (B), ($C_2$), ($C_3$) and (D). Further it also includes an embodiment of resin compositions comprising (A), (B), ($C_1$), ($C_2$), ($C_3$) and (D).

The resin compositions of the present invention may further incorporate salts or oxides, other than the aforementioned compound ($C_2$), containing at least one element selected from Groups I, II and III of the periodic table, and/or known additives for polyolefin.

These additives include antioxidants, ultraviolet absorbers, plasticizers, static eliminators, slipping agents, colors, fillers and other polymeric substances, and may be added within limits not to impair the effect and function of the present invention. Concrete examples of the additives are as follows.

Antioxidant: 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl-3-(3', 5'-di-t-butyl-4'-hydroxyphenyl) propyonate, 4,4'-thiobis-(6-t-butylphenol) and the like.

Ultraviolet absorber: ethylene-2-cyano-3,3-diphenyl acrylate, 2-(2'-hydroxy-5'-methylphenyl)benzotriazole, 2-(2'-hydroxy-3'-t-butyl-5'-methylphenyl)5-chlorobenzotriazole, 2-hydroxy-4-methoxybenzophenone, 2,2'-dihydroxy-4-methoxybenzophenone, 2-hydroxy-4-octoxybenzophenone and the like.

Plasticizer: dimethyl phthalate, diethyl phthalate, dioctyl phthalate, wax, liquid paraffine, phosphoric acid esters and the like.

Static eliminator: pentaerythrit monostearate, sorbitan monopalmitate, sulfated polyolefins modified with sulfuric acid, polyethylene oxide, carbowax, and the like.

Slipping agent: ethylenebisstearoamid, butyl stearate and the like.

Color: carbon black, phthalocyanine, quinacrydone, indolin, azo pigments, red ocher and the like.

Filler: glass fiber, asbestos, balastonite, calcium silicate and the like.

Many other polymeric substances may also be blended within limits not to deteriorate the effect and function of the present invention.

The components are incorporated by usin ribbon blender, high-speed mixer-cokneader, mixing roll, extruder, intensive mixer, or the like, to give the compositions of the present invention.

The resin compositions of the present invention can be molded into desired articles such as films, sheets, tubes, bottles, cups and the like through known melt extrusion molding machine, compression molding machine, heat molding machine, rotary molding machine, dipping molding machine and the like. The extrusion temperature for molding is suitably selected depending on the types, molecular weights and incorporation ratio of component resins, type of extruder and the like, and is generally in a range of from 170° to 350° C.

Where the resin compositions of the present invention are used as a layer of a multilayered structure, the multilayered structure may assume any layer construction. Suitable examples of the layer construction are, where the resin composition of the present invention, polyolefin, EVOH and adhesive are represented by F, A, B and AD, respectively, as shown below.

Here, suitable example of AD is the polyolefin ($C_3$) modified with an unsaturated carboxylic acid or derivatives thereof used in the present invention.

2 layers: A/F
3 layers: A/F/B, F/B/F, F/AD/B
4 layers: F/B/AD/A, A/F/AD/B
5 layers: F/AD/B/AD/F, A/F/B/AD/A, A/F/B/F/A
6 layers: A/F/AD/B/AD/A
7 layers: A/F/AD/B/AD/F/A In these multilayered structures, the resin composition of the present invention can be replaced by scraps of the multilayered structure. Further scraps of other polyolefin molding can be incorporated. Therefore, where AD has been used in such scraps, the resin composition of the present invention necessarily contains the AD.

The multilayered structures having the above layer construction are, since they comprise EVOH that has excellent gas barrier property, useful for packaging food, medical articles such as medicines and medical utensils, which require high gas barrier packaging. In particular, multilayered structures comprising at least two layers of EVOH (B) layer and the resin composition (F) layer are preferred because of their high gas barrier properties.

For forming multilayered structures, generally speaking the best process is what is known as co-extrusion molding, which comprises using separate extruders in a number corresponding to the number of types of resin layers and simultaneously co-extruding the plurality of melts, laminated one upon another, of the resins melted in the extruders. Also available are extrusion coating, dry lamination and like processes. Molded articles of the present invention, or of multilayered structures containing them can further be stretched by monoaxial stretching, biaxial stretching, blow stretching or the like to give molded articles having still distinctive characteristics in mechanical properties, gas barrier properties and the like. Accordingly, molded articles obtained from the resin compositions of the present invention have not only uniform and neat appearance but, because of high compatibility among components, various excellent characteristics such as strength properties and gas barrier properties, and hence have industrially great significance.

Other features of the invention will become apparent in the course of the following descriptions of exemplary embodiments which are given for illustration of the invention and are not intended to be limiting thereof. In the Examples, "parts" means "parts by weight".

EXAMPLES

Example 1

Blend pelletization was conducted with 50 parts of a low density polyethylene (melt index determined according to ASTM-D1238: 1.5 g/10 min; density determined according to ASTM-D1505: 0.92 g/cm$^3$) and 50 parts of fine powder of titanium dioxide through an extruder at 200° C. to obtain a master batch of titanium dioxide.

Then, 95 parts of a polypropylene (melt index (ASTM-D1238, 230° C.):0.5 g/10 min), 5 parts of EVOH (ethylene content: 33 mol %, saponification degree: 99.9% and melt index (190° C., 2160 g): 1.5 g/10 min), 4 parts of the titanium dioxide master batch prepared above and 2 parts of S-EVOH (ethylene content: 89 mol %, saponification degree: 91% and melt index (190° C., 2160 g): 5.1 g/10 min) were dry blended, and the blend was fed to an extruder with a full flight type screw having a diameter of 40 mm, an L/D of 24 and a compression ratio of 3.8 and formed into film through a flat die having a width of 550 mm. The film formation temperatures of the extruder and the die were 190° to 230° C. and 220° C., respectively. A film having a thickness of 50$\mu$ was taken up on a winder continuously for 6 hours. There was no generation of lip stain on dielip. The film thus obtained exhibited uniform and good compatibility and showed no phase-separated irregular matters caused by poor compatibility.

Comparative Example 1

Example 1 was repeated except that S-EVOH was not blended, and a blend of the polypropylene, EVOH and titanium dioxide master batch was formed into film. About 30 minutes after the start of the operation, many phase-separated irregular matters, which had not been present in Example 1, were observed, and the number increased with time. The film obtained had extremely poor appearance.

Examples 2 through 5

Blends were obtained by dry blending the polypropylene (A) used in Example 1, the EVOH (B) used in Example 1, the titanium dioxide master batch used in Example 1 and various S-EVOH (D)'s as shown in Table 1in ratios as shown, and the blends thus prepared were formed into films in the same manner as in Example 1. There was no generation of lip stain on dielip. The films thus obtained were evaluated for the film surface appearance and the results are shown in Table 1.

The evaluation results of the film surfaces are shown in terms of the following levels, Excellent: exhibited uniform and high compatibility, showed no phase-separated irregular matters.

Good: exhibited uniform and high compatibility, but generated a few small phase-separated irregular matters upon long-period film formation operation.

Fairly good: showed a good compatibility, but generated partly a few phase-separated irregular matters.

Poor: showed an improved compatibility, but generated a few phase-separated irregular matters.

dielip. Evaluation results of the films obtained are shown in Table 1.

TABLE 1

| Example | Polypropylene (PP) (parts) | EVOH (B) (parts) | Inorganic fine powder (C₁) | | S- EVOH(D) | | | Appearance of film surface |
|---|---|---|---|---|---|---|---|---|
| | | | Type | (parts*) | Ethylene content (mol %) | Saponif. degree of vinyl acetate component (%) | (parts) | |
| 1 | 95 | 5 | titanium oxide | 2 | 89 | 91 | 2 | excellent |
| 2 | 95 | 5 | titanium oxide | 2 | 61 | 94 | 2 | fairly good |
| 3 | 95 | 5 | titanium oxide | 2 | 89 | 43 | 4 | good |
| 4 | 64 | 36 | titanium oxide | 2 | 93 | 23 | 18 | fairly good |
| 5 | 69 | 31 | titanium oxide | 2 | 74 | 82 | 2 | fairly good |
| 6 | 87 | 13 | talc | 26 | 89 | 91 | 3 | excellent |
| 7 | 85 | 15 | " | 30 | 61 | 94 | 19 | good |
| 8 | 91 | 9 | " | 75 | 89 | 43 | 7 | fairly good |
| 9 | 91 | 9 | " | 69 | 93 | 23 | 4 | fairly good |
| 10 | 91 | 9 | " | 69 | 74 | 82 | 4 | good |
| 11 | 92 | 8 | titanium oxide | 2 | 89 | 91 | 2 | excellent |
| 12 | 90 | 10 | talc | 25 | 89 | 91 | 2.5 | good |

*) "Parts" herein means parts by weight of the pure inorganic powder in master batch.

Examples 6 through 10

A talc master batch was prepared by adding 50 parts of talc fine powder to 50 parts of a low density polyethylene (melt index according to ASTM-D1238: 1.5 g/10 min, density by ASTM-D1505: 0.92 g/cm³), and dry blending the mixture through a kneading extruder at 200° C.

Blends were obtained by dry blending the polypropylene (A) used in Example 1, the EVOH (B) used in Example 1, the talc master batch prepared above and various S-EVOH (D)'s as shown in Table 1 in ratios as shown, and the blends thus prepared were formed into films in the same manner as in Example 1. There was no generation of lip stain on dielip. The films thus obtained were evaluated for the film surface appearance and the results are shown in Table 1.

Comparative Example 2

Example 6 was repeated except that S-EVOH (D) was not used, and thus a blend of the polypropylene, EVOH and talc master batch was formed into film. Immediately after the start of the operation, the lip became dirty and a number of nonuniform condensed matters, which had not been seen in Example 6, were observed in the film. The film had many holes and film formation was not possible.

Examples 11 and 12

A blend was obtained by adding 20 parts of the S-EVOH (D) used in Example 1 to 80 parts of the EVOH (B) used in Example 1, followed by blend pelletization of the mixture through an extruder at 225° C. A dry blend of 10 parts of the blend thus prepared, 92 parts of the polypropylene used in Example 1 and 4 parts of the titanium dioxide master batch used in Example 1 was extruded into film (Example 11). Another dry blend of 12.5 parts of the same blend, 90 parts of the polypropylene used in Example 1 and 50 parts of the talc master batch used in Example 1 was also extruded into film (Example 12). There was no generation of lip stain on dielip.

Example 13

A mica master batch was prepared by adding 50 parts of mica to 50 parts of a low density polyethylene (melt index according to ASTM-D1238: 1.5 g/10 min, density by ASTM-D1505: 0.92 g/cm³), and dry blending the mixture through an extruder at 200° C.

Pellets were obtained by blend pelletizing 92.5 parts of the polypropylene (A) used in Example 1, 26 parts of this mica master batch, 7.5 parts of the EVOH (B) used in Example 1, and the pellets thus obtained were formed into film in the same manner as in Example 1. There was no generation of lip stain on dielip. The obtained film showed, while showing a good compatibility, partly a few phase-separated irregular matters.

Example 14

A hydrotalcite master batch was prepared by blend pelletizing 2 parts of hydrotalcite and 100 parts of low density polyethylene through a kneading extruder at 200° C.

Pellets were obtained by blend pelletizing 100 parts of the resin composition used in Example 2 (95 parts of PP+5 parts of EVOH+5 parts of titanium dioxide) and 1 part of the hydrotalcite master batch prepared above, and the obtained pellets were formed into film by extrusion in the same manner as in Example 1. There was no generation of lip stain on dielip. The film thus obtained was more uniform and showed better compatibility than that obtained in Example 2, and contained no phase-separated irregular matters.

Example 15

A calcium carbonate master batch was prepared by blend pelletizing 50 parts of fine powder calcium carbonate and 50 parts of low density polyethylene through a kneading extruder at 200° C.

Pellets were obtained by blend pelletizing 95 parts of the polypropylene (A) used in Example 1, 5 parts of the EVOH (B) used in Example 1, 24 parts of the above-prepared calcium carbonate master batch and 4 parts of the S-EVOH used in Example 1, and the pellets were formed into film by extrusion in the same manner as in Example 1. There was almost no generation of lip stain on dielip. The film obtained showed uniform and good compatibility but, generated, upon long-time formation operation, a few small phase-separated irregular matters.

Example 16

A master batch was prepared by blend pelletizing 5 parts of titanium dioxide, 60 parts of fine powder calcium carbonate and 35 parts of low density polyethylene through a kneading extruder at 200° C.

Pellets were obtained by blend pelletizing 94 parts of the polypropylene (A) used in Example 1, 6 parts of the EVOH (B) used in Example 1, 20 parts of the above-prepared master batch and 4 parts of the S-EVOH used in Example 1, and the pellets were formed into film by extrusion in the same manner as in Example 1. There was almost no generation of lip stain on dielip. The film obtained showed some improvement in compatibility but, generated a few phase-separated irregular matters.

Example 17

A blend (F) was obtained by blend pelletizing a polypropylene (A) having a melt index of 0.5 g/10 min, an EVOH (B) having an ethylene content of 32.5 mol %, a saponification degree of 99.9% and a melt index of 1.4 g/10 min, the talc master batch (M) and S-EVOH (D) used in Example 6 and an adhesive resin ($C_3$) of a maleic acid-modified polypropylene (ADMER QF-500, made by Mitsui Petrochemical Industries, Ltd.) in a ratio of A:B:M:D:$C_3$ of 63:10:40:2:5. The blend (F) thus obtained and the above EVOH (B) and adhesive resin {AD ($C_3$)} were fed to separate extruders to conduct 4-kind/7-layer co-extrusion molding to obtain a sheet having a layer construction of A/F/AD/B/AD/F/A (thickness ratio: 30/15/2.5/5/2.5/15/30). (A) was extruded through an extruder equipped with a single screw having a diameter of 65 mm and an L/D of 22 at 200° to 240° C., (F) through an extruder equipped with a single screw having a diameter of 40 mm and an L/D of 26 at 160° to 230° C., (AD) through an extruder with a single screw having a diameter of 40 mm and an L/D of 22 at 160 to 230° C., and (B) through an extruder with a single screw having a diameter of 40 mm and an L/D of 26 at 170° to 210° C., and all the above melts were joined through a feed block type die having a width of 600 mm at 240° C. into the multilayered sheet having a thickness of 1000μ. There was no generation of lip stain on dielip. After 24 hours' continuous operation, the sheet properties were still good, showing no phase-separated irregular matters caused by poor compatibility, and no abnormal flow or delamination.

Comparative Example 3

Example 17 was repeated except that S-EVOH (D) was not used, to conduct co-extrusion molding to obtain a sheet. Immediately after the start of the molding operation, the sheet showed turbulence (wavy pattern) and many coagulated matters. The number of the coagulated matters increased with time and the obtained sheet had extremely bad appearance.

Example 18

The sheet obtained in Example 17 was granulated, and to 100 parts of the obtained granules 2 parts of the S-EVOH used in Example 1 was dry blended. Example 17 was repeated except for using the this blend instead of (F), to conduct co-extrusion molding to obtain a sheet. There was no generation of lip stain on dielip. Good sheet was obtained even after 24 hours' continuous operation, and the sheet showed no phase-separated irregular matters caused by poor compatibility, and no abnormal flow or delamination.

Example 19

A talc master batch (M) was prepared by blend pelletizing polyethylene and talc in a ratio by weight of 40/60. A dry blend (F) was obtained by blending in a Henshel type mixer at room temperature for 3 minutes 87.5 parts of an isotactic polypropylene (A) having a density (ASTM-D1505) of 0.91 g/cm$^3$ and a melt index (ASTM-D1238) of 0.8 g/10 min, 12.5 parts of an EVOH (B) having an ethylene content of 33 mol %, a saponification degree of 99.9% and a melt index of 1.2 g/10 min, 37.5 parts of the talc master batch prepared above and 2.5 parts of the S-EVOH (D) used in Example 1. This dry blend (F) was fed to an extruder equipped with a screw having a diameter of 40 mm and an L/D of 23, while polypropylene (A) was fed to an extruder for providing inner and outer layers, which is equipped with a screw having a diameter of 45 mm and an L/D of 22 and with an adaptor having a melt channel ramifying into two, EVOH (B) to an extruder with a screw having a diameter of 35 mm and an L/D of 23 and AD to an extruder with a screw having a diameter of 40 mm and an L/D of 22. Co-extrusion was conducted by joining all the above melts through a 4-kind/7-layer die at 240° C. to obtain bottles having an elliptical cross section, an average wall thickness of about 600μ and a capacity of about 280 cc and having a layer construction of A/F/AD/B/AD/F/A (thickness ratio: 12/6/1/2/1/6/12) by known blow molding. Then, after 48 hours' continuous operation, there was no generation of lip stain on dielip and there were still obtained bottles of uniform and good quality, which did not show any phase-separated irregular matter caused by poor compatibility.

Comparative Example 4

Example 19 was repeated except that S-EVOH (D) was not used, to mold bottles having an elliptical cross-section and a construction of 4 kinds/7 layers. Immediately after the start of the molding operation, there were observed many non-uniform phase-separated irregular matters, which had not been seen in Example 19. The number of the irregular matters increased with time and the obtained bottles had extremely bad appearance.

Example 20

The bottles obtained in Example 19 were granulated, and to 100 parts of the obtained granules 2 parts of S-EVOH (D) was dry blended. Example 19 was repeated except for using this blend instead of the dry blend (F), to obtain bottles. After 48 hours' continuous operation, there were still obtained bottles of uniform and good quality, which did not show any phase-separated irregular matter caused by poor compatibility.

Example 21

A master batch was prepared by blend pelletizing through a kneading extruder at 200° C. 45 parts of a low density polyethylene (melt index according to ASTM-D1238: 1.5 g/10 min, density according to ASTM-D1505: 0.92 g/cm$^3$), 50 parts of S-EVOH (ethylene content: 74 mol %, saponification degree of vinyl acetate component: 82% and melt index (190° C., 2160 g): 4.9 g/10 min} and 5 parts of hydrotalcite.

The bottles obtained in Example 19 were granulated, and 100 parts of the obtained granules were dry blended with 10 parts of the master batch prepared above. Example 19 was repeated except for using this dry blend instead of the dry blend (F), to obtain bottles. After 60 hours' continuous operation, there were still obtained bottles of uniform and good quality, which did not show any phase-separated irregular matter caused by poor compatibility.

Example 22

Example 1 was repeated except for using, instead of the EVOH (B), an EVOH having an ethylene content of 46 mol %, a saponification degree of 99.9% and a melt index (190° C., 2160 g) of 5.5 g/10 min, to conduct 6 hours' continuous molding operation. The film obtained was uniform and showed good compatibility and no phase-separated irregular matters caused by poor compatibility.

Comparative Example 5

Example 22 was repeated except for not blending S-EVOH, to conduct film formation from a blend of polypropylene, EVOH and titanium dioxide master batch. About one hour after the start of the molding operation, there were observed many non-uniform phase-separated irregular matters, which had not been seen in Example 22. The number of the irregular matters increased with time and the obtained film had extremely bad appearance.

Example 23

Example 1 was repeated except for using, instead of the polypropylene resin, a high density polyethylene {melt index (ASTM-D1238, 230° C.: 2.0 g/10 min}, to conduct 6 hours' continuous molding operation. The film obtained was uniform and showed good compatibility and no phase-separated irregular matters caused by poor compatibility.

Comparative Example 6

Example 23 was repeated except that S-EVOH was not used, to conduct film formation. About one hour after the start of the formation operation, there were observed nonuniform phase-separated irregular matters on both edges of the film, which had not been seen in Example 23. The number of the irregular matters increased gradually with time, and the obtained film had bad appearance.

Example 24

A mixture was prepared by first mixing in a Henshel mixer 20 parts of fine powder anhydrous sodium monohydrogenphosphate and 80 parts of an EVOH having an ethylene content of 32 mol %, a saponification degree of vinyl acetate component of 99.9% and a melt index (190° C., 2160 g) of 1.3 g/10 min, and then high speed mixing the mixture. Pellets were obtained from this mixture through a 2-stage biaxial continuous kneader with an extruder connected thereto at 220° C. The kneader had a mixing chamber having an inside diameter of 54 mm, 2-stage mixing rotors having L/D's of 5.8 (1st stage) and 4.2 (2nd stage), respectively, and a degassing means between the 2 rotors.

Blend pelletization was conducted with 10 parts of the pellets obtained, 90 parts of the polypropylene (A) used in Example 1 and 4 parts of the S-EVOH (D) used in Example 1, and the blend pellets obtained were formed into film in the same manner as in Example 1. The film obtained was uniform and showed a good compatibility but generated, upon long-period formation operation, a few small phase-separated irregular matters.

Example 25

A dry blend of 90 parts of the polypropylene resin used in Example 1, 10 parts of the EVOH used in Example 1 and 10 parts of the master batch used in Example 21 was used and film formation operation was conducted, in the same manner as in Example 1, continuously for 6 hours to obtain a film having a thickness of 50μ. The film obtained had a uniform thickness and showed no turbulence (wavy pattern) or phase-separated irregular matters caused by poor compatibility.

Comparative Example 7

A master batch was prepared by blend pelletizing 95 parts of a low density polyethylene (melt index according to ASTM-D1238: 1.5 g/10 min, density according to ASTM-D1505: 0.92 g/cm$^3$) and 5 parts of hydrotalcite through a kneading extruder at 200° C.

Example 25 was repeated except for changing the master batch to the above-prepared one, to obtain a film having a thickness of 50μ. Then, 2 hours after the start of the operation, there were observed turbulence (wavy pattern), which had not been seen in Example 25. The number of the irregular matters increased with time, and the film obtained had poor appearance.

Example 26

Pellets were obtained by dry blending 90 parts of the polypropylene resin used in Example 1, 10 parts of the EVOH used in Example 1 and 10 parts of the master batch used in Example 21, and then melt extruding the blend through an extruder with a full flight type screw having a diameter of 40 mm, an L/D of 24 and a compression ratio of 3.8.

Example 17 was repeated except for using the pellets obtained above instead of the blend (F), to obtain a sheet having a thickness of 1,000μ. After 24 hours' continuous operation, there was still obtained a good sheet having no turbulence (wavy pattern) which did not show any phase-separated irregular matters, flow instability or delamination.

Example 27

Example 1 was repeated except for changing the S-EVOH to another one having an ethylene content of 89 mol %, a saponification degree of 91%, an acid value of 3.0 mgKOH/g, and a melt index (190° C., 2160 g) of 4.0 g/10 min, to conduct continuous film formation operation for 6 hours. The film obtained was uniform and showed good compatibility and no phase-separated irregular matters caused by poor compatibility.

Example 1-a through 8-a

A co-extruded 2-kind/3-layer film with inner and outer layers of low density polyethylene and intermediate layer pf a resin blend composition was prepared. The resin blend composition for the intermediate layer was obtained by dry blending a low density polyethylene (A) (melt index according to ASTM-$D_{1238}$: 2.1 g/10 min), an EVOH (B) (ethylene content: 32.5 mol %, saponification degree of vinyl acetate component: 99.9% and melt index (190° C., 2160 g): 1.4 g/10 min}, S-EVOH (D) {ethylene content: 74 mol %, saponification degree of vinyl acetate component: 82% and melt index (190° C., 2160 g): 4.9 g/10 min} and a maleic anhydride-modified polyethylene (adhesive resin) ($C_3$) (ADMER LF-500, made by Mitsui Petrochemical Industries, Ltd.) in the ratio shown in Table 1-a. The blend composition was extruded through an extruder equipped with a full flight type screw having a diameter of 45 mm, an L/D of 22 and a compression ratio of 3.8 to give pellets (E). Co-extrusion was conducted with an extruder equipped with a screw having a diameter of 45 mm and an L/D of 22 for the low density polyethylene for inner and outer layers, an extruder with a screw having a diameter of 35 mm and an L/D of 23 for the blend pellets obtained above for intermediate layer, and with a 2-kind/3-layer die at 220° C., to obtain a film having a total thickness of 60$\mu$ and a blend layer thickness of 20$\mu$. The co-extruded film thus obtained was evaluated for appearance, peeling strength between the low density polyethylene layer and the blend layer (peeled at an angle of 90°, rate of extension: 100 mm/min), oxygen gas permeability (with OX-TRAN 10-50A made by Modern Control Co. at 20° C., 0% RH). The results are shown in Table 1-a.

Comparative Example 1-a

A low density polyethylene (melt index according to ASTM-D1238: 2.1 g/10 min) was fed to an extruder equipped with a screw having a diameter of 45 mm and an L/D of 22 and molded into a single-layer film having a thickness of 60$\mu$ through a flat die having a width of 550 mm. The molding temperatures were 190° to 220° C. for the extruder and 220° C. for the die. The oxygen permeability of the film thus obtained was measured and the result is shown in Table 1-a.

Comparative Example 2-a

Example 1-a was repeated except that the resin blend composition for intermediate layer was not allowed to contain maleic anhydride-modified polyethylene (adhesive resin), to obtain a co-extruded film of 2 kinds/3 layers.

The film obtained had a bad appearance and a poor resistance to interlayer delamination, peeling strength being only 50 g/15 mm.

Comparative Example 3-a

Example 4-a was repeated except that the resin blend layer did not contain maleic anhydride-modified polyethylene (adhesive resin), to obtain a co-extruded film of 2 kinds/3 layers.

The film obtained had very poor appearance, its surface showing turbulence (wavy pattern) and pear-skin pattern.

Comparative Example. 4-a

Example 1-a was repeated except for changing the resin composition for intermediate layer to a blend composition of 100 parts of the low density polyethylene used in Example 1-a, 70 parts of the EVOH used in Example 1-a and 20 parts of the S-EVOH used in Example 1-a, to obtain a co-extruded film of 2 kinds/3 layers. The obtained film showed the highest oxygen permeability but had a poor appearance with intralayer delamination being observed.

TABLE 1 - a

| | Blending ratio (parts by weight) | | | | Appearance* | Peel strength (g/15 mm) | Oxygen gas permeability cc/$m^2$ · day · atm |
|---|---|---|---|---|---|---|---|
| | Poly-olefin(A) | EVOH(B) | S-EVOH(D) | Modified poly-olefin($C_3$) | | | |
| Example 1-a | 100 | 30 | 3 | 5 | good | 570 | 22.0 |
| Example 2-a | 100 | 30 | 3 | 10 | good | 600 | 22.3 |
| Example 3-a | 100 | 30 | 3 | 40 | good | 610 | 22.5 |
| Example 4-a | 100 | 30 | 10 | 5 | good | 620 | 22.1 |
| Example 5-a | 100 | 30 | 20 | 5 | good | 615 | 22.4 |
| Example 6-a | 100 | 50 | 10 | 5 | good | 580 | 19.0 |
| Example 7-a | 100 | 50 | 20 | 5 | good | 588 | 19.2 |
| Example 8-a | 100 | 50 | 40 | 5 | good | 590 | 19.6 |
| Comparative Example 1-a | 100 | — | — | — | — | — | 240 |
| Comparative Example 2-a | 100 | 30 | 3 | — | poor | 50 (intralayer delamination) | 22.5 |
| Comparative Example 3-a | 100 | 30 | 10 | — | poor | 540 | 22.3 |
| Comparative Example 4-a | 100 | 70 | 20 | — | poor | 30 (intralayer delamination) | 16.0 |

*Appearance evaluation
good: shows no turbulence (wavy pattern), pear-skin pattern or phase-separated irregular matters.
poor: shows wavy pattern and/or pear-skin pattern.

Example 9-a

Example 4-a was repeated except for using a polypropylene (melt index according to ASTM-D1238:0.5 g/10 min) and a maleic anhydride-modified polypropylene adhesive resin (ADMER QF-500, made by Mitsui Petrochemical Industries, Ltd.) instead of the low density polyethylene (A) and the maleic anhydride-modified polyethylene (ADMER LF-500) ($C_3$), respectively, to obtain a co-extruded film of 2 kinds/3 layers with the polypropylene for inner and outer layers and the resin blend composition for intermediate layer.

The film obtained had neat appearance and showed a peeling strength of 595 g/15 mm and oxygen gas permeability of 20.1 cc/$m^2$·day.atm.

Comparative Example 5-a

Example 9-a was repeated except that the maleic anhydride-modified polypropylene (adhesive resin) was not contained in the resin blend layer, to obtain a co-extruded film of 2 kinds/3 layers.

The film was of poor appearance, the surface showing turbulence (wavy pattern) and pear-skin pattern. The peel strength was 520 g/15 mm and the oxygen gas permeability was 20.3 cc/m$^2$·day·atm.

Example 10-a

A co-extruded sheet with its inner and outer layers of polypropylene and intermediate layer of the resin blend described below was obtained. The composition and blending ratio of the intermediate layer was 100 parts of a polypropylene (A) (melt index according to ASTM-D1238: 0.5 g/10 min), 30 parts of an EVOH (B) {ethylene content: 32.5 mol %, saponification degree of vinyl acetate component: 99.9%, melt index (190° C., 2160 g): 1.4 g/10 min), 10 parts of an S-EVOH (D) {ethylene content: 74.0 mol %, saponification degree of vinyl acetate component: 82%, melt index (190° C., 2160 g) : 4.9 g/10 min} and 5 parts of a maleic anhydride-modified popypropylene (adhesive resin) (C3) (ADMER QF-500, made by Mitsui Petrochemical Industries, Ltd.). The polypropylene (A) was extruded through an extruder equipped with a single screw having a diameter of 65 mm and an L/D of 22, at 200° to 240° C., and the resin blend composition through an extruder equipped with a single screw having a diameter of 40 mm and an L/D of 26, at 160° to 220° C., and the two extruded melts were joined through a feed block type die having a width of 600 mm at 240° C. into a sheet having a total thickness of 1,000μ and an intermediate layer thickness of 100μ. The sheet thus obtained had neat appearance without intralayer delamination, its surface showing no turbulence (wavy pattern) or pear-skin pattern.

Example 11-a

A master batch was obtained by blend pelletizing, through a kneader at 200° C., 44 parts of a low density polyethylene (melt index according to ASTM-D1238: 1.5 g/10 min, density according to ASTM-D1505: 0.92 g/cm$^3$:), 50 parts of an S-EVOH (ethylene content: 74 mol %, saponification degree of vinyl acetate component: 82%), 5 parts of hydrotalcite and 1 part of calcium stearate.

Example 1 was repeated except for using a dry blend of 80 parts of the polypropylene resin used in Example 1, 20 parts of the EVOH used in Example 1 and 10 parts of the master batch prepared above, to conduct 6 hours' continuous operation to obtain a film having a thickness of 50μ.

The film thus obtained was of uniform thickness and had a neat appearance without turbulence (wavy pattern) or phase-separated irregular matters caused by poor compatibility.

Example 12-a

A master batch was obtained by blend pelletizing, through a kneader at 200° C., 49 parts of a low density polyethylene (melt index according to ASTM-D1238: 1.5 g/10 min, density according to ASTM-D1505: 0.92 g/cm$^3$), 50 parts of an S-EVOH (ethylene content: 74 mol %, saponification degree of vinyl acetate component: 82%) and 1 part of calcium stearate.

Example 1 was repeated except for using a dry blend of 80 parts of the polypropylene resin used in Example 1, 20 parts of the EVOH used in Example 1 and 10 parts of the master batch prepared above, to conduct 6 hours' continuous operation to obtain a film having a thickness of 50μ.

The film thus obtained was uniform and good in compatibility, but showed, partly, a few phase-separated irregular matters.

Example 13-a

A master batch was obtained by blend pelletizing, through a kneader at 200° C., 45 parts of a low density polyethylene (melt index according to ASTM-D1238: 1.5 g/10 min, density according to ASTM-D1505: 0.92 g/cm$^3$), 50 parts of an S-EVOH (ethylene content: 74 mol %, saponification degree of vinyl acetate component: 82%) and 5 parts of disodium-calcium ethylenediaminetetraacetate, Example 1 was repeated except for using a dry blend of 80 parts of the polypropylene resin used in Example 1, 20 parts of the EVOH used in Example 1 and 10 parts of the master batch prepared above, to conduct 6 hours' continuous operation to obtain a film having a thickness of 50μ.

The film thus obtained did not, although showing a few phase-separated irregular matters, show any turbulence (wavy pattern).

Example 14-a

Pellets were obtained by dry blending 90 parts of the polypropylene resin used in Example 17, 10 parts of the EVOH used in Example 17, 10 parts of the adhesive resin of maleic acid-modified polypropylene and 10 parts of the master batch used in Example 21 and melt extruding the obtained blend through an extruder equipped with a full flight type screw having a diameter of 40 mm, an L/D of 24 and a compression ratio of 3.8.

Example 17 was repeated except for using the pellets thus obtained instead of the blend (F), to obtain a sheet having a thickness of 1,000μ. After 48 hours' continuous operation, there was still obtained a good sheet without turbulence (wavy pattern). The obtained sheet did not show any phase-separated irregular matter caused by poor compatibility, or flow instability or delamination.

Obviously, numerous modifications and variations of the present invention are possible in light of the above teachings. It is therefore to be understood that within the scope of the appended claims, the invention may be practiced otherwise than as specifically described herein.

What is claimed is:

1. A resin composition comprising components (A), (B), (C2) and/or (C3), and (D) wherein:
   (A) is a polyolefin:
   (B) is a saponified product of an ethylene vinyl acetate copolymer having an ethylene content of 20 to 65 mol % and a saponification degree of the vinyl acetate component of at least 96%;
   (C2) is at least one compound selected from the group consisting of metal salts of higher fatty acids having from 8 to 22 carbon atoms; metal salts of ethylenediaminetetraacetic acid; and hydrotalcite;
   (C3) is a polyolefin modified with unsaturated carboxylic acid or derivative thereof; and
   (D) is a saponified product of an ethylene-vinyl acetate copolymer having an ethylene content of 68 to 98 mol % and a saponification degree of the vinyl acetate component of at least 20%;
   wherein the blending ratio by weight of polyolefin (A) to component (B) ranges from 60:40 to 99.9:0.1; component (C2) is present in an amount of about 0.0001 to 1 part by weight based upon 100 parts of (A) and (B) in total; component (C3) is present in an amount of about 1 to 50 parts by weight based upon 100 parts by weight of (A) and (B) in total; and component (D) is present in an amount of 0.3 to 30 parts by weight based upon 100 parts of (A) and (B) in total.

2. A resin composition according to claim 1, wherein said polyolefin (A) is selected from polypropylene and polyethylene.

3. A resin composition according to claim 1, wherein said compound of (C2) is hydrotalcite.

4. A resin composition according to claim 1, comprising (A), (B), (C2), (C3) and (D).

5. A resin composition according to claim 1, used for lamination with a layer of a saponified product of an ethylene-vinyl acetate copolymer having an ethylene content of 20 to 65 mol %.

* * * * *